United States Patent
Arzt et al.

(10) Patent No.: US 10,239,987 B2
(45) Date of Patent: Mar. 26, 2019

(54) AQUEOUS POLYURETHANE—VINYL POLYMER HYBRID DISPERSIONS

(71) Applicant: Allnex Austria GmbH, Werndorf (AT)

(72) Inventors: Anton Arzt, Neu-Tillmitsch (AT); Ulrike Kuttler, Vasoldsberg (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 111 days.

(21) Appl. No.: 15/326,115

(22) PCT Filed: Jul. 24, 2015

(86) PCT No.: PCT/EP2015/066986
§ 371 (c)(1),
(2) Date: Jan. 13, 2017

(87) PCT Pub. No.: WO2016/016117
PCT Pub. Date: Feb. 4, 2016

(65) Prior Publication Data
US 2017/0218110 A1    Aug. 3, 2017

(30) Foreign Application Priority Data

Jul. 31, 2014 (EP) .................................... 14179407

(51) Int. Cl.

| | |
|---|---|
| *C08G 18/42* | (2006.01) |
| *C09D 175/06* | (2006.01) |
| *C09D 5/00* | (2006.01) |
| *C08G 18/83* | (2006.01) |
| *C09D 151/08* | (2006.01) |
| *C08F 283/00* | (2006.01) |
| *C08G 18/75* | (2006.01) |
| *C08G 18/62* | (2006.01) |
| *C08G 18/79* | (2006.01) |
| *C08G 18/67* | (2006.01) |
| *C08G 18/32* | (2006.01) |
| *C08G 18/72* | (2006.01) |
| *C08G 18/08* | (2006.01) |
| *C08G 18/66* | (2006.01) |
| *C08G 18/76* | (2006.01) |
| *C08G 18/28* | (2006.01) |
| *B05D 3/00* | (2006.01) |

(52) U.S. Cl.
CPC ......... *C08G 18/4288* (2013.01); *B05D 3/007* (2013.01); *C08F 283/006* (2013.01); *C08G 18/0823* (2013.01); *C08G 18/2835* (2013.01); *C08G 18/3228* (2013.01); *C08G 18/3275* (2013.01); *C08G 18/4291* (2013.01); *C08G 18/6254* (2013.01); *C08G 18/6659* (2013.01); *C08G 18/67* (2013.01); *C08G 18/724* (2013.01); *C08G 18/755* (2013.01); *C08G 18/765* (2013.01); *C08G 18/792* (2013.01); *C08G 18/831* (2013.01); *C09D 5/002* (2013.01); *C09D 151/08* (2013.01); *C09D 175/06* (2013.01)

(58) Field of Classification Search
CPC combination set(s) only.
See application file for complete search history.

(56) References Cited

U.S. PATENT DOCUMENTS

| | | | |
|---|---|---|---|
| 3,169,945 A | 2/1965 | Hostettler | |
| 5,494,980 A * | 2/1996 | Buter | ................. C08F 283/008 523/201 |
| 6,087,444 A * | 7/2000 | Swarup | ............. C08G 18/0823 523/404 |
| 6,632,915 B1 | 10/2003 | Schwarte et al. | |
| 2010/0171238 A1* | 7/2010 | Frohlich | ............. C08G 18/683 264/299 |
| 2013/0041072 A1 | 2/2013 | Sommer et al. | |

FOREIGN PATENT DOCUMENTS

EP    0 522 420    1/1993

OTHER PUBLICATIONS

"Glycidyl ester based telechelic polyesters", Research Disclosure 505033, May 2006. (Year: 2006).*
International Search Report dated Oct. 22, 2015 in International Application No. PCT/EP2015/066986.

* cited by examiner

*Primary Examiner* — Nicole M. Buie-Hatcher
(74) *Attorney, Agent, or Firm* — Wenderoth, Lind & Ponack, L.L.P.

(57) ABSTRACT

The invention relates to aqueous polyurethane-vinyl polymer hybrid dispersions comprising, as building blocks, hydrophobically modified hydroxy-functional polyesters A, acids B that have further groups which react with isocyanates under formation of urethanes, ureas, or thiourethanes, compounds G having only one hydroxyl group, and one or more tertiary amino groups, olefinically unsaturated monomers H2 having a polymerisable ethylenic unsaturation and a further functional group which reacts with an isocyanate group under bond formation, olefinically unsaturated monomers H1 having at least one polymerisable ethylenic unsaturation and no further functional group which reacts with an isocyanate group, and multifunctional isocyanates I having at least two isocyanate groups per molecule, to a process of their preparation, and to a method of use thereof.

7 Claims, No Drawings

AQUEOUS POLYURETHANE—VINYL POLYMER HYBRID DISPERSIONS

FIELD OF THE INVENTION

The present invention relates to aqueous polyurethane-vinyl polymer hybrid dispersions which are prepared by polymerisation, initiated by free radicals, of ethylenically unsaturated monomers and polyurethane prepolymers containing acid groups and hydroxyl groups, to a method for their preparation, and to their use particularly as coating binder in multilayer coatings.

BACKGROUND OF THE INVENTION

Dispersions of polyurethane-vinyl polymer hybrids made by radically initiated copolymerisation of ethylenically unsaturated monomers and polyurethane macromonomers have been known, i. a. from EP 0 522 420 A2. These dispersions have been used in a variety of applications, including preparation of basecoats in multilayer coatings used for the painting of cars. In such multilayer applications, a key property of the coating layers is their intercoat adhesion, in this case, between the primer-surfacer layer, and the basecoat, and the basecoat layer and the clearcoat which is the topmost coating layer. Another property that is important for the basecoat is its water and humidity resistance, which needs constant improvement.

SUMMARY OF THE INVENTION

It has been found in the experiments underlying this invention that an aqueous polyurethane-vinyl polymer hybrid dispersion made by polymerisation, initiated by free radicals, of a mixture of ethylenically unsaturated monomers having hydroxyl groups, in the presence of multifunctional isocyanates and polyurethane prepolymers containing acid groups and hydroxyl groups which prepolymers are based on polyurethanes made from hydrophobically modified polyesters lead to improved basecoat coating compositions.

The invention therefore relates to aqueous polyurethane-vinyl polymer hybrid dispersions comprising a polyurethane-vinyl polymer hybrid UV, and water, wherein the polyurethane-vinyl polymer hybrid UV is dispersed. The building blocks of the aqueously dispersed polyurethane-vinyl polymer hybrid comprise
 hydrophobically modified hydroxy-functional polyesters A,
 acids B that have further groups which react with isocyanates under formation of urethanes, ureas, or thiourethanes,
 optionally, hydroxy-functional oligomeric or polymeric compounds C which may be polyesters, polycarbonates, polyethers, polyamides, polydienes and polyenes, and which have at least two hydroxyl groups per molecule,
 optionally, monomeric hydroxy compounds D having at least two hydroxyl groups per molecule,
 optionally, compounds E having at least one primary or secondary amino group, and at least one hydroxyl group per molecule,
 optionally, compounds F having two or more primary or secondary amino groups per molecule and no hydroxyl groups,
 compounds G having only one hydroxyl group, and one or more tertiary amino groups,
 olefinically unsaturated monomers H comprising monomers H2 having a polymerisable ethylenic unsaturation and a further functional group which reacts with an isocyanate group under bond formation, and olefinically unsaturated monomers H1 having at least one polymerisable ethylenic unsaturation and no further functional group which reacts with an isocyanate group, and
 multifunctional isocyanates I having at least two isocyanate groups per molecule.

The hydrophobically modified polyesters A have side chains with chain length of preferably from four to twenty carbon atoms, and are preferably obtained by reaction of a polyester A' having residual hydroxyl and acid groups, by reaction of the acid groups with a monofunctional compound A4 having an epoxide or aziridine functionality, and a linear or branched alkyl residue of at least four carbon atoms, in which reaction at least 90% of the remaining acid groups are converted to ester or amide groups which groups link the side chains to the polyester main chain.

It has been found that polyurethane-vinyl polymer hybrid dispersions having such hydrophobically modified polyesters A as building blocks yield coating films with improved interlayer adhesion, and increased water and humidity resistance.

DETAILED DESCRIPTION OF THE PREFERRED EMBODIMENTS

Hydrophobically modified polyesters A are preferably made from polyesters A' based on aliphatic diols A1 and aliphatic and/or aromatic diacids A2, or on monohydroxymonoacids A3, having one hydroxyl group and one acid group per molecule, or mixtures of these starting materials. Small amounts, such as up to 10% of the amount of substance of dihydroxy compounds, or up to 10% of the amount of substance of diacids, or up to 10% of the amount of substance of the monohydroxymonoacids, may be replaced by higher functional compounds of the same kind, i. e. by triols A11, triacids A21, or hydroxy acids A31 having more than one functional hydroxyl or acid group. In the first step of the synthesis of the polyesters A, the mixture of hydroxy-functional and acid-functional compounds A1, A2, A3, and optionally, A11, A21, and A31 is esterified at elevated temperature of up to 250° C., under removal of the water formed in the polycondensation reaction, and optionally, in the presence of an esterification catalyst. The stoichiometry is preferably chosen such that the hydroxyl value of the resulting polyester A' is at least 20 mg/g, and up to 100 mg/g. A low acid number of preferably not more than 5 mg/g is obtained. The polyester A' formed in this reaction is then treated at a temperature of preferably from 150° C. to 220° C. with a compound A4 which may be a monoepoxide compound or a monoaziridine compound which reacts with the acid groups of the polyester A' under addition and formation of an ester or an amide group, and of a hydroxyl or amino group by ring opening of the oxirane or aziridine ring. The polyesters A which are formed by reaction of the polyesters A' with the compound A4 preferably have a remaining acid number of 0.1 mg/g or less. Their hydroxyl number is preferably at least 22 mg/g, and also preferably, not more than 105 mg/g.

The acid value or acid number $w_{Ac}$ is defined, according to DIN EN ISO 2114 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g". This value is determined in the examples according to this standard.

The hydroxyl value or hydroxyl number $w_{OH}$ is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g". This value is determined in the examples according to this standard. Preferred compounds A1 are linear, branched, and cyclic aliphatic dihydroxy compounds preferably having from two to twelve carbon atoms. Preferred are 1,2-ethanediol, 1,2- and 1,3-propanediol, 1,2- and 1,4-butanediol, 2,2-dimethyl-1,3-propanediol (neopentylglycol), 2-methyl-2,4-pentanediol, 1,4-bis-hydroxymethylcyclohexane, and the so-called bifunctional fatty alcohols which are alpha-, omega-dihydroxyalkanes with from six to twenty-five carbon atoms, particularly 1,6-hexanediol, 1,8-octanediol, 1,10-decanediol, 1,12-dodecanediol, 1,13-tridecanediol, 1,18-octadecanediol, 1,21-heneicosanediol, and 1,25-pentacosanediol, and also carbohydate-based etheralcohols such as the 1,4:3,6-dianhydrohexitols isosorbide, isomannide, and isoidide. The longer-chain alcohols among these can also contribute to increased hydrophobicity, and higher toughness of the coating layers made from polyurethane-vinyl polymer hybrids prepared therewith.

Preferred compounds A2 are aliphatic dicarboxylic acids having from three to twelve carbon atoms, such as malonic acid, succinic acid, glutaric acid, adipic acid, octanedioic acid, and also dimeric fatty acids having up to forty carbon atoms, and also aromatic dicarboxylic acids such as isophthalic acid, terephthalic acid, and naphthalene dicarboxylic acids.

Preferred compounds A3 are hydroxybenzoic acid, lactic acid, gamma-hydroxybutyric acid, delta-hydroxyvaleric acid, and epsilon-hydroxycaproic acid.

Preferred compounds A11 are glycerol, trimethylolethane, trimethylolpropane, pentaerythritol, ditrimethylolethane, ditrimethylolpropane, dipentaerythritol, erythritol, threitol, and mannitol.

Preferred compounds A21 are trimellithic acid, trimesic acid, carballylic acid, and aconitic acid.

Preferred compounds A31 are citric acid, tartaric acid, alpha-, beta- and gamma-resorcylic acid, (3,5-dihydroxybenzoic acid, 2,4-dihydroxybenzoic acid, and 2,6-dihydroxybenzoic acid), and gentisic acid (2,5-dihydroxybenzoic acid).

Preferred compounds A4 are glycidol (2,3-epoxy-1-propanol), and ethers and esters thereof such as glycidyl acetate, glycidyl propionate, glycidyl butyrate, glycidyl pivalate, glycidyl 2-ethylhexanoate, glycidyl 2,2-dimethyloctanoate, commercial mixtures of the ester of glycidol with a mixture of isomeric alpha-branched decanoic acids, lauryl glycidyl ether, and stearyl glycidyl ether. Other useful monoepoxides are epoxidised alkenes, such as 1,2-epoxhexane, 1,2-epoxydecane, 1,2-epoxydodecane, and 1,2-epoxyoctadecane, and alkylaziridines preferably having from six to twelve carbon atoms such as hexylaziridine, heptylaziridine, nonylaziridine, and dodecylaziridine.

The acids B that have further groups which react with isocyanates under formation of urethanes, ureas, or thiourethanes preferably have at least one hydroxyl, amino or thiol group, and an acid group which is preferably a carboxylic acid group or a sulfonic acid group, and are more preferably selected from the group consisting of 2,2-(bis-hydroxymethyl)acetic acid, 2,2-(bishydroxymethyl)-propionic acid, 2,2-(bishydroxymethyl)butyric acid, and 2-aminoethanesulfonic acid.

The hydroxy-functional oligomeric or polymeric compounds C which are optionally used may be polyesters, poly-carbonates, polyethers, polyamides, polydienes and polyenes, and which have at least two hydroxyl groups per molecule include polyhydroxy-polyethers of the formula

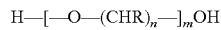

in which R is hydrogen or a lower alkyl radical, optionally with various substituents, n is a number from 2 to 6 and m is a number from 10 to 120.

Examples are poly(oxytetramethylene) glycols, poly(oxyethylene) glycols and poly(oxy-propylene) glycols. The preferred polyhydroxy-polyethers are poly(oxypropylene) glycols having a molar mass in the range from 400 g/mol to 5000 g/mol.

The polyhydroxy-polyesters are prepared by esterification of organic polycarboxylic acids or their anhydrides with organic polyols. The polycarboxylic acids and the polyols can be aliphatic or aromatic polycarboxylic acids and polyols.

The polyols used for the preparation include those mentioned under A1, and also, in a mass fraction of not more than 10%, based on the mass of the polyols used in the polyhydroxy-polyesters, trishydroxyalkylalkanes, such as, for example, trimethylolpropane, and tetrakishydroxyalkylalkanes, such as, for example, pentaerythritol.

The acid component of the polyesters primarily consists of low molar mass polycarboxylic acids or their anhydrides having from two to eighteen carbon atoms in the molecule. Suitable acids are, for example, phthalic acid, isophthalic acid, terephthalic acid, tetrahydrophthalic acid, hexahydrophthalic acid, succinic acid, adipic acid, azelaic acid, sebacic acid, maleic acid, glutaric acid, hexachloroheptanedicarboxylic acid, alkyl- and alkenylsuccinic acid, for example n-octenylsuccinic acid and n- and iso-dodecenylsuccinic acid, tetrachlorophthalic acid, trimellithic acid and pyromellithic acid. Instead of these acids, their anhydrides, where these exist, can also be used. Dimeric and trimeric fatty acids can also be employed as the polycarboxylic acids.

The terms polyhydroxy-polyether and polyhydroxy-polyester are also to be understood as meaning those products of this type which contain monomers having carboxyl, phosphonic acid or sulfonic acid groups.

Polyhydroxy-polyesters which are derived from lactones can furthermore be used in the invention. These products are obtained, for example, by reaction of a lactone with a polyol. Such products are described in U.S. Pat. No. 3,169,945.

The polylactone-polyols which are obtained by this reaction are distinguished by the presence of a terminal hydroxyl group and by recurring polyester contents which are derived from the lactone. The lactone used as the starting material can be any desired lactone or any desired combination of lactones, and this lactone should contain at least four carbon atoms in the ring, for example from five to eight carbon atoms, and two hydrogen atoms should be directly bonded to the carbon atom bonded to the oxygen group of the ring.

Preferred lactones are the caprolactones. The most preferred lactone is unsubstituted epsilon-caprolactone. This lactone is particularly preferred, since it is available in large amounts and produces coatings which have excellent properties. Various other lactones can furthermore be used individually or in combination.

Examples of aliphatic polyols which are suitable for the reaction with the lactone are ethylene glycol, 1,3-propanediol, 1,4-butanediol, 1,6-hexanediol, dimethylolcyclohexane, trimethylol-propane and pentaerythritol.

Possible starting compounds are furthermore polycarbonate-polyols and polycarbonate-diols These OH-functional polycarbonates can be prepared by reaction of polyols, such as 1,3-propanediol, 1,4-butanediol, 1,6-hexanediol, diethylene glycol, triethylene glycol, 1,4-bishydroxymethylcyclohexane, 2,2-bis(4-hydroxycyclohexyl)propane, neopentylglycol, trimethylolpropane or pentaerythritol, with di-carbonates, such as dimethyl, diethyl or diphenyl carbonate, or phosgene. Mixtures of such polyols can likewise be employed. Mixtures of polyhydroxy-polyethers, polyhydroxy-polyesters and polyhydroxy-polycarbonates are likewise possible.

Further oligomeric or polymeric hydroxy-functional compounds are polyamides, polydienes and polyenes where the oligomer or polymer chain is a polyamide, a polyene or a polydiene, and there are at least two, preferably terminal, hydroxyl groups per molecule. Particularly preferred are dihydroxy compounds based on polybutadiene, or on hydrogenated polybutadiene. These compounds also contribute to hydrophobicity and toughness of the coating layer made from a polyurethane-vinyl polymer hybrid comprising these building blocks.

The monomeric hydroxy compounds D having at least two hydroxyl groups per molecule, which are optionally used, are aliphatic diols which may be linear, branched or cyclic, and have from two to forty carbon atoms. Preferred compounds D are 1,2-ethanediol, 1,2- and 1,3-propanediol, 1,2- and 1,4-butanediol, 2,2-dimethyl-1,3-propanediol (neopentylglycol), 2-methyl-2,4-pentanediol, 1,4-bis-hydroxymethylcyclohexane, and the so-called bifunctional fatty alcohols which are alpha-, omega-dihydroxyalkanes with from six to twenty-five carbon atoms, particularly 1,6-hexanediol, 1,8-octanediol, 1,10-decanediol, 1,12-dodecanediol, 1,13-tridecanediol, 1,18-octadecanediol, 1,21-heneicosanediol, and 1,25-pentacosanediol, and also carbohydate-based etheralcohols such as isosorbide, isomannide, and isoidide. The longer-chain alcohols among these can also contribute to increased hydrophobicity, and higher toughness of the coating layers made from polyurethane-vinyl polymer hybrids prepared therewith.

It is possible to use one or both of compounds C and D.

The compounds E which are optionally used, have one primary or secondary amino group, and at least one hydroxyl group per molecule, such as 2-aminoethanol, and may have preferably secondary amino groups, and two hydroxyl groups. Preferred compounds are selected from the group consisting of the monohydroxymonoamines 2-aminoethanol, 2-methylaminoethanol, and 3-aminopropanol, the dihydroxymonoamines 2-amino-1,3-propanediol, diethanolamine, and 1,1'-iminodi-2-propanol (diisopropanolamine). These compounds are optionally used, and react with an isocyanate group preferably to form a urea, and they can introduce additional hydroxyl groups into the polymer formed.

The compounds F having two or more amino groups per molecule, and no hydroxyl groups, are aliphatic linear or branched diamines having from two to ten carbon atoms and at least two primary amino groups, such as 1,4-diaminobutane, 1,6-diaminohexane, and 2-methyl-1,5-diaminopentane. These compounds are optionally used, and provide chain extension under formation of urea groups by reacting with isocyanate-functional compounds formed during the synthesis.

It is preferred to use at least one of compounds E and F.

The compounds G having not more than one hydroxyl group, and at least one tertiary amino group, are preferably aliphatic, linear, branched or cyclic, and have from four to twelve carbon atoms; preferred compounds are N—N-dimethylaminoethanol, 1-dimethylamino-2-propanol, 1-dimethylamino-3-propanol, and also N-(2-hydroxyethyl)piperazine. These compounds are used as neutralising agents.

The olefinically unsaturated compounds H comprise monomers H2 which are hydroxy-functional monomers H2 having an olefinic unsaturation which are radically polymerisable, and also, olefinically unsaturated monomers H1 that are radically copolymerisable and do not have functional groups in their molecules that can react with an isocyanate group. The monomers H2 preferably have at least one hydroxyl group, more preferably one or two hydroxyl groups, and most preferably two hydroxyl groups, and are preferably partial esters of polyhydric alcohols having at least two hydroxyl groups, and olefinically unsaturated carboxylic acids selected from the group consisting of acrylic acid, methacrylic acid, and their homologues such as vinylacetic acid, crotonic acid and isocrotonic acid. Preferred monomers H2 are hydroxyethyl(meth)acrylate, hydroxypropyl-(meth)acrylate, glycerol mono(meth)acrylate, trimethylolpropane mono(meth)acrylate, where "(meth)acrylate" stands for "acrylate or methacrylate". Preferred monomers H1 are esters of (meth)acrylic acid with aliphatic linear, branched or cyclic monoalcohols having from one to twelve carbon atoms in the alkyl group, particularly methyl (meth)acrylate, ethyl (meth)acrylate, butyl (meth)-acrylate, hexyl(meth)acrylate, 2-ethylhexyl(meth)acrylate, and isobornyl (meth)acrylate, and also, copolymerisable vinyl monomers such as styrene, vinyltoluene, acrylonitrile, and methacrylonitrile. It is also possible to replace up to 10% of the mass of the mono-unsaturated monomers by mono-mers having two or more olefinically unsaturated groups, such as hexandioldi(meth)-acrylate or trimethylolpropane tri(meth)acrylate.

The multifunctional isocyanates I having at least two isocyanate groups per molecule are aromatic or aliphatic or mixed aliphatic-aromatic isocyanates, and preferably selected from the group consisting of trimethylene diisocyanate, tetramethylene diisocyanate, pentamethylene diisocyanate, hexamethylene diisocyanate (HDI), propylene diisocyanate, ethyl ethylene diiso-cyanate, 2,3-dimethylethylenediisocyanate, 1-methyltrimethylene diisocyanate, cyclopentylene 1,3-diisocyanate, cyclohexylene 1,4-diisocyanate, cyclohexylene 1,2-diisocyanate, phenylene 1,3-diisocyanate, phenylene 1,4-diisocyanate, toluylene 2,4-diisocyanate, toluylene 2,6-diiso-cyanate, biphenylene 4,4'-diisocyanate, bis-(4-isocyanatophenyl) methane (MDI), naphthylene 1,5-diisocyanate, naphthylene 1,4-diisocyanate, 1-isocyanatomethyl-5-isocyanato-1,3,3-tri-methylcyclohexane (IPDI), bis-(4-isocyanatocyclohexyl) methane (H12-MDI), 4,4'-diiso-cyanato-diphenyl ether, 2,3-bis-(8-isocyanatooctyl)-4-octyl-5-hexylcyclohexene, trimethylhexa-methy-lene diisocyanates, tetramethylxylylene diisocyanates, uretdiones of the above diisocyanates, isocyanurates of the above diisocyanates and allophanates of the above diisocyanates. Mixtures of such di- or polyisocyanates can likewise be employed.

Mixtures of two or more of the mentioned compounds can also be used, for all the compounds listed supra.

The amounts of these educts, or starting materials for the polyurethane-vinyl polymer hybrid UV are chosen such that the following conditions are preferably met:

a) the mass fraction $w(A)=m(A)/m(UV)$ of hydrophobically modified polyester A in the polyurethane-vinyl polymer hybrid UV, where $m(A)$ is the mass of the polyester A, and $m(UV)$ is the mass of the polyurethane-vinyl polymer hybrid UV, is from 20% to 60% (from 20 g/[100 g] to 60 g/[100 g]), particularly preferably from 25% to 55%,
b) the ratio of the amount of substance of hydrophobic modifier A4 in the polyester A to the amount of substance of residual acid groups in the polyester A' is from 1.1 mol/mol to 1.7 mol/mol, particularly preferably from 1.2 mol/mol to 1.6 mol/mol, and especially preferred, from 1.25 mol/mol to 1.5 mol/mol,
c) the mass fraction $w(H)=m(H)/m(UV)$ of olefinically unsaturated monomers H in the polyurethane-vinyl hybrid polymer UV is from 10% to 60%, particularly preferably from 25% to 50%,
d) the glass transition temperature $T_g$ of the vinyl polymer part is lower than, or equal to, 20° C., and particularly preferably, lower than, or equal to, 0° C., if the mass fraction $w(H)$ as defined supra is 35% or more, which condition is particularly favourable to achieve a low degree of blistering,
e) the mass fraction $w(H2)=m(H2)/[m(H1)+m(H2)]$ of hydroxy-functional monomers H2 in the olefinically unsaturated monomers H is from 5% to 35%, particularly preferably from 7% to 30%.

In a particularly preferred embodiment, at least two of these conditions are fulfilled, viz., a) and b); a) and c); a) and d); a) and e); b) and c); b) and d); b) and e); c) and d); c) and e); and d) and e). More preferably, at last three of these conditions are fulfilled, viz. a), b) and c); a), b) and d); a), b) and e); a), c), and d); a), c), and e); a), d), and e); b), c), and d); b), c), and e); b), d), and e), and c), d), and e). Still more preferably, four of these conditions are fulfilled, viz., a), b), c), and d); a), b), c) and e); and b), c), d) and e). Most preferred, all conditions a), b), c), d), and e) are fulfilled.

When stating mass fractions of educts in the addition polymer UV, the hydroxy-functional educts are always referred to in their hydroxyl form, having —OH end groups, and the amino-functional educts are always referred to in their amine form having >NH or —NH$_2$ end groups, etc. Likewise, isocyanates are referred to in their isocyanate-functional form having —N═C═O end groups, and olefinically unsaturated monomers are referred to in their olefinically unsaturated form.

The polyesters A' are made in a polyesterification process wherein a mixture of aliphatic diols A1 and aliphatic and/or aromatic diacids A2, optionally in the presence of hydroxy-acids A3, and further optionally, in the presence of one or more of hydroxy compounds A11 having more than two hydroxyl groups, acid compounds A21 having more than two acid groups, preferably carboxyl groups, and hydroxy-acids A31 having more that one hydroxyl group or more than one acid group, or at least two hydroxyl groups and at least two acid groups, is esterified at elevated temperature of up to 250° C., under removal of the water formed in the polycondensation reaction.

In a second step, the polyester A' formed in the first step having residual hydroxyl and acid groups is treated at a temperature of preferably from 150° C. to 220° C. with a monofunctional compound A4 selected from the group consisting of a monoepoxide compound and a monoaziridine compound whereby preferably at least 90% of the acid groups of the polyester A' are consumed under addition and formation of an ester or an amide group, and of a hydroxyl or amino group by ring opening of the oxirane or aziridine ring. Hydrophobically modified polyesters A are obtained having an acid number of 0.1 mg/g or less.

The hydrophobically modified polyesters A are then mixed with acids B that have further groups which react with isocyanates under formation of urethanes, ureas, or thiourethanes, optionally, hydroxy-functional oligomeric or polymeric compounds C which may be polyesters, poly-carbonates, polyethers, polyamides, polydienes and polyenes, and which have at least two hydroxyl groups per molecule, and further optionally, monomeric hydroxy compounds D having at least two hydroxyl groups per molecule. The use of compounds C is optional, as well as the use of compounds D, where it is possible to use only C, only D, both C and D, or none of both.

The mixture of A, B, C (if used), and D (is used) is then heated under stirring preferably to at least 60° C., to form a homogeneous solution, and then reacted by addition of a substoichiometric quantity of the multifunctional isocyanate I preferably over a time of from twenty minutes to one hundred and twenty minutes, depending on the size of the lot, and keeping the reaction temperature in a range of from 60° C. to 150° C. An intermediate also referred to as "prepolymer" is formed which has hydroxyl functional groups. By "substoichiometric", it is meant that the amount of substance of isocyanate groups in the quantity of multifunctional isocyanate I added is less than the sum of the amounts of substance of isocyanate-reactive groups, in this case, hydroxyl groups, of the compounds A, B, C, and D present in this reaction. At the end of this stage of he reaction, no more unreacted isocyanate groups are present in the reaction mixture.

To this prepolymer, a solution is then added which comprises at least one olefinically unsaturated monomer H1 having no further functional group other than one or more vinyl or polymerisable olefinically unsaturated groups, and at least one olefinically unsaturated monomer H2 having at least one hydroxyl group and a vinyl or polymerisable olefinically unsaturated group, optionally, an antioxydant or radical scavenger is also added which is preferably a sterically hindered phenol, such as a phenol having bulky substituents, preferably tert-butyl groups, in the 2- and 6-positions, and an alkyl substituent in the 4-position, further optionally, a solvent S which is inert in the reaction, and the solution and the prepolymer are homogenised. To this homogeneous mixture, further multifunctional isocyanate I is added, this time in stoichiometric excess so that the amount of substance of isocyanate groups $n(NCO)$ exceeds the sum $n(OH, \Sigma)$ of the amounts of substance of isocyanate-reactive groups, in this case, hydroxyl groups, by at least 2%, in other words, $n(NCO)/n(OH, \Sigma) \geq 1.02$ mol/mol. A mixture is then added which comprises the compounds E (if used), F (if used), and G, as well as water, and the resulting mixture is homogenised well for preferably from thirty to ninety minutes before adding an aqueous solution of a radical initiator, preferably an alkyl hydroperoxide, homogenised again, and then, preferably, an aqueous solution of a reducing agent, preferably ascorbic acid, is added. The polymerisation reaction is continued for preferably from one hour to four hours, after which time, the resulting dispersion of the polyurethane-vinyl polymer hybrid UV is cooled to room temperature and filtered.

It is possible to vary the degree of polymerisation of the resulting polyurethane-vinyl polymer hybrid, by adjusting the stoichiometry of the polyurethane part and also by selecting the amount of radical initiator and reducing agent, and also by varying the ratio of the mass $m(U)$ of the polyurethane part (stemming from compounds A, B, C, D, E, F, and I), to mass m(H) of the vinyl polymer stemming from compounds H.

The dispersions of the polyurethane-vinyl polymer hybrid UV according to the invention are suitable for diverse uses, for example for the preparation of coating systems, inter alia for coating wood, as binders for water-dilutable adhesives or as resins for printing inks.

They can be combined with and are in general compatible with other aqueous dispersions and solutions of plastics, for example acrylic and/or methacrylic polymers, polyurethane, polyurea resins, polyester resins and epoxy resins, thermoplastics based on polyvinyl acetate, -vinyl chloride, -vinyl ether, -chloroprene and -acrylonitrile and ethylene/butadiene/styrene copolymers. They can also be combined with substances which have a thickening action and are based on polyacrylates or polyurethanes containing carboxyl groups, hydroxyethyl-cellulose, polyvinyl alcohols and inorganic thixotropic agents, such as bentonite, sodium-magnesium silicates and sodium-magnesium-fluorine-lithium silicates.

The polyurethane-vinyl polymer hybrid dispersions according to the invention can be applied to the most diverse substrates, for example ceramic, wood, glass, concrete and preferably plastics, such as polycarbonate, polystyrene, polyvinyl chloride, polyester, poly(meth)acrylates, acrylonitrile/butadiene/styrene polymers and the like, and preferably to metal, such as iron, copper, aluminum, steel, brass, bronze, tin, zinc, titanium, magnesium and the like. They adhere to the various substrates without adhesion-promoting primers or intermediate layers.

The polyurethane-vinyl polymer hybrid dispersions according to the invention are suitable, for example, for the production of corrosion-preventing coatings and/or intermediate coatings for the most diverse fields of use, in particular for the production of metallic and solid base paints in multi-coat build-ups of paint for the fields of painting of automobiles and plastics, and for producing primer paints for the field of painting of plastics.

Because of the short flush-off times of the base paints based on the polyurethane-vinyl polymer hybrid dispersions according to the invention, the pigmented coat of base paint can be over-varnished with a clear varnish without a stoving step (wet-in-wet process) and the coatings can then be stoved together or subjected to forced drying. Base paints prepared with the polyurethane-vinyl polymer hybrid dispersions according to the invention give paint films of the same quality largely independently of the stoving or drying temperature, so that they can be employed both as a repair paint for motor vehicles and as a stoving paint for series painting of motor vehicles. In both cases, paint films result having a good adhesion to the original coating and a good resistance to condensation water.

The crosslinking agents customary in the paint industry, such as, for example, water-soluble or -emulsifiable aminoplast crosslinkers such as urea, cyclic urea, melamine or benzoguanamine resins, polyisocyanates or prepolymers having terminal isocyanate groups, water-soluble or water-dispersible polyaziridines and blocked polyisocyanates, can be added during formulation of water-dilutable paints using the polyurethane-vinyl polymer hybrid dispersions according to the invention. The aqueous coating systems can contain all the inorganic or organic pigments and dyestuffs which are known and are customary in paint technology, as well as wetting agents, foam suppressants, flow control agents, stabilisers, catalysts, fillers, plasticisers and solvents. The coating composition is completed to a paint by adding the usual additives, such as thickeners, flow modifiers, wetting agents, light stabilisers, and pigments, particularly metal flake pigments. The paint obtained is the applied to a substrate, and hardened by crosslinking the paint to form a coating film on the substrate, by heating the coated substrate to a temperature of preferably from 50° C. to 180° C.

The polyurethane-vinyl polymer hybrid dispersions according to the invention can also be used directly for gluing any desired substrates. To achieve specific adhesive properties, the polyurethane-vinyl polymer hybrid dispersions according to the invention can be mixed with other dispersions or solutions of plastics (see above). Crosslinking agents, such as, for example, polyisocyanates or prepolymers having terminal isocyanate groups or water-soluble or -emulsifiable melamine or benzoguanamine resins, can furthermore be added to improve the resistance to heat and peeling.

The adhesives based on the polyurethane-vinyl polymer hybrid dispersions according to the invention can contain the additives customary in adhesives technology, such as plasticizers, solvents, film-binding auxiliaries, fillers and synthetic and naturally occurring resins. They are specifically suitable for the production of gluings of substrates in the motor vehicle industry, for example gluing of interior finishings, and in the shoe industry, for example for gluing the shoe sole and shoe shaft. The adhesives based on the polyurethane-vinyl polymer hybrid dispersions according to the invention are prepared and processed by the customary methods of adhesives technology used for aqueous dispersion and solution adhesives.

The invention is further illustrated by the examples that follow.

EXAMPLES

In the specification and the examples, the following symbols are used:

M molar mass, SI unit: g/mol n amount of substance, SI unit: mol

η dynamic viscosity, SI unit: Pa·s, determined in accordance with DIN EN ISO 3219, at 23° C. and a shear rate of 100 s$^{-1}$ (if not stated differently)

$W_B$ mass fraction of substance B in a mixture M, which mixture may be a solution, SI unit: kg/kg, or any multiple thereof, such as cg/g=10 g/kg=g/(100 g)=%, defined as $W_B = m_B/m_M$, where $m_B$ is the mass of substance B, and $m_M$ is the mass of the mixture or solution, this quantity also referred to as "strength" when used for aqueously diluted acids or bases $w_s$ mass fraction of non-volatile matter, determined in accordance with DIN EN ISO 3251 on a sample of 1 g, dried at 105° C. for one hour $w_{OH}$ hydroxyl value or hydroxyl number, ratio of the mass $m_{KOH}$ which has the same amount of substance of hydroxyl groups, —OH, as the sample B, and the mass $m_B$ of the sample B, determined in accordance with DIN EN ISO 4629, the usual unit is "mg/g"

$w_H$ acid value or acid number, ratio of the mass $m_{KOH}$ which is needed to neutralise a sample B having acidic hydrogen groups H, and the mass $m_B$ of the sample B, determined in accordance with DIN EN ISO 2114, the usual unit is "mg/g"

w(H) mass fraction of polymer derived from monomers H1 and H2 in the polyurethane-vinyl polymer hybrid resin, calculated as w(H)=m(H)/[m(U)+m(H)], where m(U) is the mass of the polyurethane part pH the negative decadic logarithm of the numeric value of the molar concentration of hydrogen ions, H$^1$, in mol/L, defined as pH=−1 g [c(H¹)/(mol. L⁻¹)], determined in accordance with DIN ISO 976 on an aqueously diluted sample having a mass fraction of solids of 10%

$T_g$ glass transition temperature, measured by dynamic scanning calorimetry with a heating rate of 10 K/min (in these examples, measured on polymers of monomers H1 and H2 in the ratio as used in the example, the polymer having a degree of polymerisation which is high enough so that $T_g$ is not dependent on the degree of polymerisation anymore)

Preparation of Polyester A' (Comparative Example)

A mixture of 47 g of 1,6-hexanediol (M=118.18 g/mol; n=0.398 mol), 33.5 g of adipic acid (M=146.14 g/mol; n=0.229 mol), and 22 g of isophthalic acid (M=166.13 g/mol; n=0.132 mol) was charged and heated to 220° C. The amount of substance of functional groups in the reactant mixture was: n(OH)=0.795 mol; n(COOH)=0.458 mol+ 0.265 mol=0.723 mol. Water formed in the reaction was distilled off with the aid 8 g of xylene added as an azeotrope former. After having reached the theoretical amount of water (14 g) and an acid value as determined on a sample of below 3 mg/g, the residual xylene was distilled off, and the polyester was allowed to cool down to room temperature (23° C.).

hydroxyl value: 45 mg/g; acid number: 2.8 mg/g

Preparation of Polyester A 89.4 g of polyester A' were reacted with 1.4 g of the glycidyl ester of neodecanoic acid (®Cardura E 10P, sold by Momentive Specialty Chemicals Inc.) at a temperature between 180° C. and 200° C. for about one hour until the acid value as determined on a sample was below 0.1 mg/g.

hydroxyl value: 45 mg/g; acid number: 0.08 mg/g

Example 1 (Comeparative Example)

863 g of polyester A' were heated to 130° C. together with 79 g of dimethylolpropionic acid (DMPA) and the mixture was kept at this temperature until a homogeneous solution was formed. 150 g of tetramethylxylylene diisocyanate (TMXDI) were then metered in over a period of from thirty to forty-five minutes, while stirring was continued at 130° C. until no more free isocyanate groups could be detected.

After cooling to 70° C., a solution consisting of 360 g of 2-ethylhexyl acrylate, 36 g of glycerol monomethacrylate, 18 g of 1,4-butyleneglycol and 0.66 g of 2,6-di-tert-butyl-4-methylphenol (BHT) was added rapidly and the mixture was homogenised. 244 g of TMXDI were added over a period of fifteen minutes, and the components were reacted at 75° C. until the mass fraction of free isocyanate groups in current reaction mixture was 1.2% Immediately after reaching this mass fraction of free isocyanate groups, 49 g of diethanolamine were added, and the reaction mixture was held at the resulting temperature and stirred for sixty minutes. After addition of 38 g of N,N-dimethylethanolamine, the mixture was homogenised for ten minutes. 3012 g of water having a temperature of 75° C. were then added to the prepolymer solution, while stirring intensively. After cooling the mixture to 75° C., the mixture was stirred for a further hour. 2.4 g of an aqueous solution of tert-butyl hydroperoxide having a mass fraction of solute of 70% was added, and the resulting mixture was homogenised for five minutes at 75° C. Then, a mixture of 25 g water and 3.5 g ascorbic acid was added over a period of between thirty and forty-five minutes. The temperature was then kept at between 75° C. and 80° C. for two further hours. After cooling to room temperature (23° C.), the resulting dispersion was filtered through a filter having a pore size of 25 µm. The dispersion thus obtained had the following characteristic data:

$w_s$=36.4%; pH=7.9; η=69 mPa·s; $T_g$=−56° C.; w(H)=22%

Example 2 (Comparative Example)

950 g of polyester A' were heated to 130° C. together with 111 g of dimethylolpropionic acid (DMPA), and the mixture was kept at this temperature under stirring until a homogeneous solution was obtained. 206 g of tetramethylxylylene diisocyanate (TMXDI) were then metered in over a period of from thirty to forty-five minutes, while stirring was continued at 130° C. until no more free isocyanate groups were detected. After cooling to 70° C., a solution consisting of 246 g 2-ethylhexyl acrylate, 610 g of methyl methacrylate, 88 g of glycerol monomethacrylate, 2.47 g of 1,4-butyleneglycol and 2.3 g of 2,6-di-tert-butyl-4-methylphenol (BHT) was added rapidly and the mixture was homogenised. 301 g of TMXDI were then added over a period of fifteen minutes, and the components were then reacted at 75° C. until the mass fraction of free isocyanate groups in the current reaction mixture was 0.98%. Immediately after reaching this concentration of free isocyanate groups, a mixture which has a temperature of from 70° C. to 75° C., composed of 25.8 g of 1,5-diamino-2-methylpentane, 56 g of N,N-dimethylethanolamine and 4315 g of water were added and stirred intensively at 75° C. for sixty minutes. Then, 5.5 g of an aqueous solution of tert-butyl hydroperoxide having a mass fraction of solute of 70% was added, and the resulting mixture was homogenised for five minutes at from 70° C. to 75° C. After homogenisation, a mixture of 130 g of water and 7.6 g of ascorbic acid was added over a period of from thirty to forty-five minutes. Temperature was then kept at between 75° C. and 80° C. for two further hours. After cooling to room temperature (23° C.), the dispersion was filtered through a filter having a pore size of 25 µm. The dispersion thus obtained has following characteristic properties: mass fraction of non-volatile matter $w_s$=36.1%; pH=7.7; η=230 mPa·s; $T_g$=42° C.; w(H)=37%

Example 3

950 g of polyester A were heated to 130° C. together with 98 g of dimethylolpropionic acid (DMPA) and the mixture was kept at this temperature until a homogeneous solution was obtained. 190 g of tetramethylxylylene diisocyanate (TMXDI) were then metered in over a period of from thirty to forty-five minutes, while stirring was continued at 130° C. until no free isocyanate groups could be detected. After cooling to 70° C., a solution consisting of 625 g of 2-ethylhexyl acrylate, 368.6 g of methyl methacrylate, 88 g of glycerol monomethacrylate and 2.3 g of 2,6-di-tert-butyl-4-methylphenol (BHT) was added rapidly and the resulting mixture was homogenised. A mixture of 124 g TMXDI and 143 g of 5-isocyanato-1-(isocyanatomethyl)-1,3,3-trimethyl-cyclohexane (IPDI) were then added over a period of fifteen minutes, and the mixture was subjected to reaction at 75° C. until the mass fraction of free isocyanate groups in the current reaction mixture was 0.88%. Immediately after reaching this concentration of free isocyanate groups, a mixture having a temperature of from 70° C. to 75° C., composed of 23.8 g of 2-methyl-1,5-pentanediamine, 58.6 g of N,N-dimethylethanolamine and 4335 g of water were added and stirred intensively at 75° C. for sixty minutes. Afterwards, 6.28 g of an aqueous solution of tert-butylhydroperoxide having a mass fraction of solute of 70% was added and the resulting mixture was homogenised for five minutes at from 70° C. to 75° C. After homogenisation, a mixture of 190 g of water and 8.7 g of ascorbic acid was added over a period of from thirty to forty-five minutes. Temperature was then kept at between 75° C. and 80° C. for two further hours. After cooling to room temperature (23° C.), the dispersion was filtered through a filter having a pore size of 25 μm. The dispersion thus obtained has following characteristics: $w_s$=35.8%; pH=8.4; η=310 mPa·s; $T_g$=−10° C.; w(H)=41%

Example 4

950 g of polyester A were heated to 130° C. together with 98 g of dimethylolpropionic acid (DMPA) and the mixture was kept at this temperature until a homogeneous solution was obtained. 190 g of tetramethylxylylene diisocyanate (TMXDI) were then metered in over a period of from thirty to forty-five minutes, while stirring was continued at 130° C. until no free isocyanate groups were detected.

After cooling to 70° C., a solution consisting of 709 g of 2-ethylhexyl acrylate, 419 g of methyl methacrylate, 24.8 g of 1,6-hexanediol diacrylate, 88 g of glycerol monomethacrylate, 60 g of 1,4-butanediol and 2.3 g of 2,6-di-tert-butyl-4-methylphenol (BHT) was added rapidly and the mixture was homogenised. 469 g of TMXDI are added over a period of fifteen minutes and the components were reacted at 75° C. until the mass fraction of free isocyanate groups in the reaction mixture was 1.04%. Immediately after reaching this concentration of free isocyanate groups, a mixture having a temperature of from 70° C. to 75° C., composed of 16.4 g of 2-methyl-1,5-pentanediamine, 29.3 g of diethanolamine, 58.5 g of N,N-dimethylethanolamine and 5097 g of water were added and stirred intensively at 75° C. for sixty minutes. Afterwards, 7.21 g of an aqueous solution of tert-butylhydroperoxide having a mass fraction of solute of 70% was added, and the resultant mixture was homogenised for five minutes at between 70° C. and 75° C. After homogenisation, a mixture of 230 g of water and 10 g of ascorbic acid was added over a period of thirty to forty-five minutes. Temperature was then kept at between 75° C. and 80° C. for two further hours. After cooling to room temperature (23° C.), the dispersion was filtered through a filter having a pore size of 25 μm. The dispersion thus obtained had the following characteristics: $w_s$=35.8% (1 h; 125° C.; 1 g); pH=8.4; η=310 mPa·s; $T_g$=−10° C.; w(H)=40%

Example 5

950 g of polyester A were heated to 130° C. together with 98 g of dimethylolpropionic acid (DMPA) and the mixture was kept at this temperature until a homogeneous solution was formed. 190 g of tetramethylxylylene diisoxyanate (TMXDI) were then metered in over a period of from thirty to forty-five minutes, while stirring was continued at 130° C. until no more free isocyanate groups could be detected.

After cooling to 70° C., a solution consisting of 182 g of 2-ethylhexyl acrylate, 757 g of methyl methacrylate, 21 g of 1,6-hexanediol diacrylate, 88 g of glycerol monomethacrylate, and 2.3 g of 2,6-di-tert-butyl-4-methylphenol (BHT) was added rapidly, and the mixture was homogenised. A mixture of 124 g of TMXDI and 143 g of IPDI were added over a period of fifteen minutes, and the components were reacted at 75° C. until the mass fraction of free isocyanate groups in the current reaction mixture was 0.9%. Immediately after reaching this mass fraction of free isocyanate groups, a mixture which had a temperature of from 70° C. to 75° C., composed of 12 g of 2-methyl-L5-pentanediamine, 20.9 g of diethanolamine, 58.5 g of dimethylethanolamine and 4320 g of water were added and stirred intensively at 75° C. for one hour. Afterwards, 6.1 g of an aqueous solution of tert-butylhydroperoxide having a mass fraction of solute of 70% was added and homogenised for five minutes at from 70° C. to 75° C. After homogenisation, a mixture of 190 g of water and 8.4 g od ascorbic acid was added over a period of from thirty to forty-five minutes. Temperature was then kept between 75° C. and 80° C. for two further hours. After cooling to room temperature (23° C.), the dispersion was filtered through a filter having a pore size of 25 μm. The dispersion thus obtained has following key figures: $w_s$=35.6%; pH=7.9; η=120 mPa·s; $T_g$=60° C.; w(H)=40%

Example 6

950 g of polyester A were heated to 130° C. together with 98 g of dimethylolpropionic acid (DMPA) and the mixture was kept at this temperature until a homogeneous solution was formed. 190 g of tetramethylxylylene diisoxyanate (TMXDI) were then metered in over a period of from thirty to forty-five minutes, while stirring was continued at 130° C. until no more free isocyanate groups could be detected.

After cooling to 70° C., a solution consisting of 61.1 g of 2-ethylhexyl acrylate, 254 g of methyl methacrylate, 88 g of glycerol monomethacrylate, and 2.3 g of 2,6-di-tert-butyl-4-methylphenol (BHT) was added rapidly and the mixture was homogenised. 280.5 g of TMXDI were added over a period of fifteen minutes, and the components were reacted at 75° C. until the mass fraction of free isocyanate groups in the current reaction mixture was 1.2% Immediately after reaching this mass fraction of free isocyanate groups, a mixture which had a temperature of between 70° C. and 75° C. was added, composed of 23.5 g of 2-methyl-1,5-pentanediamine, 58.5 g of dimethylethanolamine, and 3288 g of water were added and stirred intensively at 75° C. for one hour. Afterwards, 2.34 g of an aqueous solution of tert-butylhydroperoxide having a mass fraction of solute of 70% was added and homogenised for five minutes at between 70° C. and 75° C. After homogenisation, a mixture of 100 g of water and 3.24 g of ascorbic acid was added over a period of from thirty to forty-five minutes. Temperature was then kept at between 75° C. and 80° C. for two further hours. After cooling to room temperature (23° C.), the dispersion was filtered through a filter having a pore size of 25 μm. The dispersion thus obtained has following key figures: $w_s$=35.2%; pH=8.1; η=230 mPa·s; $T_g$=60° C.; w(H)=20%

Application test were conducted using steel sheets coated with a usual multi-layer coating as used in car bodies by the automotive industry. The following paints were prepared therefor:

Example 7 CED Resin 2572 g of an epoxy resin based on bisphenol A, having a number average molar mass of 380 g/mol, 440 g of a polycaprolactone diol having a number average molar mass of 550 g/mol, 661 g of bisphenol A, and 1734 g of methoxypropanol were sequentially filled into a resin kettle, and heated under stirring to 43° C. The mixture was stirred for further thirty minutes, and then cooled to 41° C. At this temperature, 221 g of diethanolamine and then, 194 g of dimethylaminopropylamine, were added, whereupon the temperature rose to a maximum of 125° C. under cooling. After continuing the reaction for two more hours under stirring at 125° C., the dynamic viscosity of a sample drawn and diluted to a mass fraction of 40% with methoxypropanol, measured at 23° C. and a shear rate of 25 s$^{-1}$, was 765 mPa·s. The reaction mass was then cooled to 120° C.

Example 8 CED Curing Agent

In a separate step, 105 g of diethanolamine and 102 g of propylene carbonate were reacted to form an adduct at 120° C. for three hours.

687.5 g of MDI were charged under exclusion of humidity into a resin kettle. At 25° C., 445.5 g of diethylene glycol monobutylether were slowly added under gentle cooling, keeping the temperature at a maximum of 40° C. The mass fraction of isocyanate groups, calculated as —N═C═O, molar mass 42.02 g/mol, was 9.9%. At a temperature of 40° C., 207 g of the adduct made in the first step were added together with 0.4 g of dibutyltin dilaurate. Due to the exothermic reaction, the temperature rose to 80° C. which was kept as upper limit by cooling. Reaction was continued under stirring for three hours at that temperature. 5 g of ethanol and 61.8 g of methoxypropanol were then added at 80° C., and stirring was continued for one further hour. 60 g of water were then added, and the mixture was homogenised while lowering the temperature to ambient (23° C.).

Example 9 CED Resin Emulsion 5822 g of the resin solution of Example 7 were charged to a reaction vessel, and heated to 120° C. under stirring. 1426 g of methoxypropanol were distilled off at that temperature under reduced pressure. Then, the remaining liquid was cooled to 95° C., and 107 g of deionised water were added, thus lowering the temperature to 80° C. 2408 g of the curing agent of Example 8 were then added, and the mixture was homogenised at 80° C. for one hour.

In a separate step, an acidic catalyst solution was prepared by dissolving 107 g of bismuth trioxide in 298.3 g of an aqueous solution of methanesulfonic acid with a mass fraction of solute of 70%, and diluting after complete dissolution by adding 7913 g of deionised water. The homogenised mixture of resin and curing agent was then added to this catalyst solution within thirty minutes under thorough stirring, whereby the mixture assumed a temperature of 40° C. The mixture was stirred for two more hours at this temperature, and then diluted by addition of 2058 g of deionised water to a mass fraction of solids of 37%.

Example 10 Grinding Resin 258 g of 2-ethylhexylamine were charged into a resin kettle equipped with a stirrer, a thermometer and distillation facilities and heated to 80° C. At this temperature, 380 g of an epoxy resin made from polypropylene glycol and epichlorohydrin, having a specific content of epoxide groups of 5.26 mol/kg, were added evenly over one hour with the temperature rising to 120° C. The reaction was continued at 120° C. for one further hour. Next, 1175 g of 2-butoxyethanol were added, and the temperature was lowered to 70° C. whereupon 1900 g of an epoxy resin based on bisphenol A and epichlorohydrin having a specific content of epoxide groups of 2.11 mol/kg were added. The mixture was heated to 120° C. and left to react for ninety minutes. The intermediate thus obtained has a mass fraction of polyoxyalkylene units (—CH(CH$_3$)—CH$_2$—O—) of 11%, and a mass fraction of alkyl groups having more than three carbon atoms, of 9%.

This intermediate was brought to a temperature of 100° C., and 204 g of 3-(N,N-dimethyl)-aminopropylamine-1 were added, and the mixture was reacted at 100° C. for one hour. 314 g of 2-butoxyethanol were then added, together with 66 g of paraformaldehyde having a mass fraction of formaldehyde of 91%. The temperature was raised to 140° C., and 36 g of water formed in the reaction were distilled off azeotropically using methyl isobutylketone as carrier. When the water was separated, the ketone was removed by distillation under reduced pressure, and the remainder was diluted to a mass fraction of solids of 55% by adding 774 g of 2-butoxyethanol.

Example 11 Pigment Paste

The following materials were added to a mixing vessel in the order shown: 207.9 g of deionised water, 16.9 g of aqueous acetic acid (30 g of acetic acid in 100 g of the aqueously diluted solution), 18.7 g of 2-butoxyethanol, 268 g of the grinding resin solution of Example 10, 10.2 g of a 50% strength solution of 2,4,7,9-tetramethyl-5-decyne-4,6-diol in 2-butoxyethanol (®Surfynol 104 BC, Air Products Nederland B. V.), 7.3 g of a carbon black pigment (®Printex 201, Evonik Industries), and 479.2 g of a titanium dioxide white pigment (®Kronos RN 59, Kronos Titan GmbH). The mixture was dispersed in a dissolver for fifteen minutes, and then ground in a ball mill for one hour.

Example 12 Preparation of CED Coating Composition

CED coating compositions were prepared from the emulsion of example 9, the pigment paste of example 11 and water, according to the following recipe:
3392 g CED Resin Emulsion (Example 9)
5982 g deionised water
626 g pigment paste (Example 11)

The ingredients were blended in the order shown under stirring and homogenised for thirty minutes at 23° C.

Example 13 Preparation of Primer/Surfacer Coating Composition

The primer-surfacer coating composition 13b used was prepared from a grey pigment paste 13ba that was completed by addition of a blend 13bb consisting of the condensation product of example 13ac which had been adjusted to a mass fraction of solids of 42% by addition of deionised water, the aqueous dispersion of example 13ad and a highly methoxymethylated melamine crosslinker.

Example 13aa—Acid Functional Polyurethane

In a first reaction, an acid functional polyurethane 13aa was prepared by charging, in a resin kettle, a mixture of 810 g of dimethylolpropionic acid in a mixture of 946 g of diethylene glycol dimethyl ether and 526 g of methyl isobutyl ketone and heating this mixture to 100° C. until complete dissolution. At this temperature, a mixture of 870 g of toluylene diisocyanate ("TDI") and 528 g of a semi-capped TDI which is a reaction product of one mol of TDI with one mol of ethyleneglycol monoethylether was added over four hours while keeping the temperature constant at 100° C. The reaction mixture was stirred at this temperature for one hour in order to complete consumption of all isocyanate groups. The mass fraction of solids was 60%. This acid functional polyurethane 13aa had an acid number of 140 mg/g and a Staudinger-Index of 9.3 cm$^3$/g, measured on solutions in N,N-dimethylformamide (DMF) at 20° C.

The semi-capped TDI was prepared separately by addition of 300 g of ethylene glycol mono-ethylether to 580 g of TDI within two hours at 30° C. and subsequent reaction for two more hours after which time a final mass fraction of isocyanate groups in the adduct of 16.5% was found.

Example 13ab—Hydroxy-Functional Polyester

In a separate step, a hydroxy-functional polyester 13ab was prepared by mixing in a resin kettle, 190 g of tripropylene glycol, 625 g of neopentyl glycol, 140 g of isomerised linoleic acid, 415 g of isophthalic acid, and 290 g of trimellitic acid anhydride, and esterification at 230° C. until the acid number of the reaction mixture had decreased to 4 mg/g. The efflux time of a 50% strength solution in 2-n-butoxyethanol of the resin formed, measured according to DIN 53211 at 20° C., was 165 s. The value of the Staudinger index of the hydroxyfunctional polyester 13ab, measured in N,N-dimethylformamide at 20° C., was 10.5 cm$^3$/g.

Example 13ac—Condensation Product 13ac of the Acid Functional Polyurethane of Example 13aa and the Hydroxy-Functional Polyester of Example 13ab 300 g of the acid functional polyurethane of example 13aa and 700 g of the hydroxy-functional polyester of example 13ab were charged to a reaction vessel equipped with stirrer, thermometer, nitrogen inlet, and distillation apparatus, mixed and heated under stirring to 155° C. The solvents were removed under a nitrogen blanket by distillation under reduced pressure to maintain a steady flow of separated solvent in the condenser. The progress of the reaction was monitored by drawing samples and analysing for acid number and viscosity. The reaction was stopped when an acid number of 36 mg/g and a Staudinger index of 16.2 cm$^3$/g had been reached, and the condensation product was then cooled to ambient temperature (23° C.) and discharged. This condensation product referred to as 13ac was fully dilutable in water after neutralisation with dimethylethanolamine, with no sedimentation or phase separation.

Example 13ad—Modified Polyester

A resin kettle equipped with stirrer and reflux condenser was charged with 192 g of tri-propylene glycol and 104 g of neopentyl glycol, the charge was heated under stirring to 110° C. 192 g of trimellithic anhydride were then added, and the mixture was heated within two hours to 170° C. The reaction mixture was held at that temperature until the acid number was 87 mg/g. After cooling to 150° C., 40 g of a commercial mixture of glycidyl esters of alpha-branched decanoic acids (®Cardura E 10, Momentive Specialty Chemicals, Inc.) and 14 g of linseed oil fatty acid were added. This mixture was then heated to 180° C. within one hour, and held at that temperature until an acid number of 55 mg/g was reached. The reaction mixture was then cooled and diluted by addition of methoxypropanol to a mass fraction of solids of 70%. To 100 g of this solution, 7 g of dimethyl ethanolamine, and 68 g of deionised water were added and homogenised with a mechanical stirrer for fifteen minutes at 600 min$^{-1}$. An aqueous dispersion with a mass fraction of solids of 40% was obtained.

Example 13b—Preparation of the Pigmented Primer-Surfacer Coating Composition

A pigmented primer-surfacer coating composition was prepared according to the following recipe: To 21.10 g of the condensation product of example 13ac which had been adjusted to a mass fraction of solids of 42% by addition of deionised water was charged, in the sequence stated, 3.35 g of deionised water, 12.65 g of a rutil-type titanium dioxide pigment (surface treated with Al and Zr compounds,®Kronos 2190, Kronos Titan GmbH), 12.65 g of precipitated barium sulfate pigment (Blanc fixe F, Sachtleben GmbH), and 0.05 g of carbon black (®Printex U, Evonik Carbon Black GmbH), and then homogenised with a mechanical stirrer at 1200 min$^{-1}$ for fifteen minutes. This pre-blend was transferred to a bead mill and ground at a temperature not exceeding 50° C. After a milling time of forty-five minutes, the required particle size of 10 μm was achieved, grinding was stopped and the paste referred to as 13ba thus formed was separated from the beads.

A mixture 13bb was prepared by charging 9.00 g of the condensation product of example 13ac which had been adjusted to a mass fraction of solids of 42% by addition of deionised water, and adding in this sequence, 27.20 g of the aqueous dispersion of example 13ad, 1.75 g of a highly methoxymethylated melamine crosslinker having a molar ratio of methoxy groups to methylene groups to melamine derived moieties of from 5.0 mol: 5.8 mol: 1 mol (Cymel® 303, Allnex USA Inc.), and 12 g of deionised water.

This mixture 13bb was added to the paste 13ba at ambient temperature (23° C.) and homogenised with a mechanical stirrer at 1200 min$^{-1}$ for fifteen minutes to obtain the pigmented primer-surfacer coating composition 13b. Dynamic viscosity of this coating composition 13b was 300 mPa·s (measured at a shear rate of 25 s$^{-1}$), and its pH value was 8.0.

Example 14 Preparation of Basecoat Coating Compositions

Basecoat coating compositions were prepared from the polyurethane-vinyl polymer hybrid dispersions of examples 1 to 6, according to the following recipe in Table 1:

TABLE 1

| Basecoat compositions (mass of constituents in g) | | |
|---|---|---|
| polyurethane - vinyl polymer hybrid dispersion ($w_s$ = 36%) | 351.2 | Part A |
| Cymel ® 327 | 15.6 | Part A |
| DMEA 10% in water | 14.4 | Part A |
| H$_2$O deionised | 115.2 | Part A |
| Rheovis ® AS 1130 (10% strength in water) | 87.4 | Part B |
| H$_2$O deionised | 227.9 | Part B |
| Aluminum flakes (Hydrolan ® 2154) | 93.6 | Part C |
| Additol ® XL 250 | 6 | Part C |
| Butylglycol | 69.2 | Part C |
| Isobutanol | 19.5 | Part D |

A basecoat composition was prepared according to the following recipe: the polyurethane-vinyl polymer hybrid dispersion (Example 1 to Example 6) was charged, in the sequence stated a methylated high imino melamine crosslinker (Cymel® 327, Allnex USA Inc.), dimethyl ethanolamine (a 10% strength solution in deionised water) and deionised water (Part A) were added to this charge and then homogenised with a mechanical stirrer at 900 min$^{-1}$. After fifteen minutes stirring, a 10% strength solution of an acrylic copolymer thickener in deionised water (Rheovis®AS 1130, BASF SE) and further deionised water (Part B) were added and homogenised for another ten minutes at 900 min$^{-1}$. The aluminum flake slurry (Part C) was prepared in a separate step by charging the aluminum flakes (silica encapsulated aluminium flakes, Hydrolan®2154, Eckart GmbH), adding the anionic wetting agent (Additol XL® 250, Allnex Austria GmbH) and butylglycol (ethylene glycol monobutyl ether) and homogenising with a mechanical stirrer at 600 min$^{-1}$ for thirty minutes. The homogenised Part C was then added with stirring at 900 min$^{-1}$ to the preblended Part A and B, and homogenised for another twenty minutes. In the last step, isobutanol (Part D) was added and the mixture was homogenised for another five minutes at 900 min$^{-1}$.

The basecoat coating compositions prepared as described were allowed to rest for twelve hours at ambient temperature (23° C.). After this time the pH value was adjusted to 8.3 by means of a 10% strength solution of dimethylethanolamine in deionised water, and the viscosity of the paints was adjusted to 300 mPa·s (measured at a shear rate of 25 s$^{-1}$), by adding deionised water. Their composition is detailed in Table 2.

TABLE 2

Basecoat Paint Compositions (masses of constituents in g)

| constituent | L1 | L2 | L3 | L4 | L5 | L6 |
|---|---|---|---|---|---|---|
| dispersion of Example 1 (comp) | 347.3 | — | — | — | — | — |
| dispersion of Example 2 (comp) | — | 350.2 | — | — | — | — |
| dispersion of Example 3 | — | — | 353.2 | — | — | — |
| dispersion of Example 4 | — | — | — | 353.2 | — | — |
| dispersion of Example 5 | — | — | — | — | 355.1 | — |
| dispersion of Example 6 | — | — | — | — | — | 359.2 |
| Cymel ® 327 | 15.6 | 15.6 | 15.6 | 15.6 | 15.6 | 15.6 |
| DMEA 10% in water | 14.4 | 14.4 | 14.4 | 14.4 | 14.4 | 14.4 |
| H$_2$O deionised | 115.2 | 115.2 | 115.2 | 115.2 | 115.2 | 115.2 |
| Rheovis ® AS 1130 (10% strength in water) | 87.4 | 87.4 | 87.4 | 87.4 | 87.4 | 87.4 |
| H$_2$O deionised | 227.9 | 227.9 | 227.9 | 227.9 | 227.9 | 227.9 |
| aluminum flakes (Hydrolan ® 2154) | 93.6 | 93.6 | 93.6 | 93.6 | 93.6 | 93.6 |
| Additol ® XL 250 | 6 | 6 | 6 | 6 | 6 | 6 |
| butylglycol | 69.2 | 69.2 | 69.2 | 69.2 | 69.2 | 69.2 |
| isobutanol | 19.5 | 19.5 | 19.5 | 19.5 | 19.5 | 19.5 |

Example 15 Preparation of Clearcoat Coating Composition

Example 15a—Hydroxy-Functional Acrylic Polymer

An acrylic copolymer was made according to the following recipe:

Into a recator equipped with a stirrer, in inert gas inlet, a heating and cooling system, and an addition funnel, the glycidylester of neodecanoic acid was charged and heated to 175° C. Within six hours, a monomer and initiator mixture was continuously added that consisted of 74.8 g of acrylic acid, 229.3 g of hydroxyethylmethacrylate, 178.3 g of tert-butylmethacrylate, 62.7 g of methylmethacrylate, and 222.4 g of styrene, together with 19.8 g of di-tert-amyl peroxide, and a polymer was formed. The reaction mixture was stirred for two further hours, by when more than 95% of conversion was noted. The copolymer was diluted by addition of butyl acetate to a mass fraction of solids of 75%, the solution was filtered after cooling to room temperature to remove suspended solids, and the mass fraction of solids was then adjusted to 70% by addition of further butyl acetate.

Example 15b—Preparation of the Clearcoat Coating Composition

Two pre-mixtures were prepared according to the following recipes:
Part A:
  825 g of the hydroxy-functional acrylic polymer solution of Example 15a
  51 g of butylacetate
  51 g of xylene
  51 g of methoxypropyl acetate
  5 g of a hindered amine light stabiliser (mixture of bis-(1,2,2,6,6-pentamethyl-4-piperidinyl)sebacate and 1-(methyl)-8-(1,2,2,6,6,pentamethyl-4-piperidinyl)sebacate, sold as Tinuvin® 292 by BASF SE) 15 g of a benzotriazole type light stabiliser (mixture of β-[3-(2-H-benzotriazole-2-yl)-4-hydroxy-5-tert.butylphenyl]-propionic acid poly[ethylene glycol] 300-ester and bis {β-[3-(2-H-benzo-triazole-2-yl)-4-hydroxy-5-tert.butylphenyl]-propionic acid}-poly (ethylene glycol) 300-ester sold as Tinuvin® 1130, BASF SE)
  2 g of a levelling agent based on a modified silicone (Additol® VXL 4930, Allnex Austria GmbH)
Part B:
  322 g of HDI trimer dissolved in butylacetate, mass fraction of solute 90% (Desmodur® N 3390 BA, Isocyanurate type, CAS Nr.: 28182-81-2, sold by Bayer Material Science AG)
  97 g of butylacetate
  40 g of xylene
  24 g of Solvent naphtha 150/180 (blend of aromatic hydrocarbons with a boiling range of from 150° C. to 180° C.)

Components of Part A were charged in the order mentioned and homogenised with a mechanical stirrer for 15 minutes at 23° C. at 900 min$^{-1}$.

In a separate step, the solution of trimeric HDI, and solvents were blended and added with stirring at 900 min$^{-1}$ to the preblended Part A. After ten minutes' homogenisation, the viscosity of the clearcoat was adjusted to 130 mPa·s (measured at a shear rate of 25 s$^{-1}$), by adding a mixture in a mass ratio of 60/40 of butyl acetate and solvent naphtha 150/180. This ready to use clearcoat coating composition must be applied within ninety minutes.

Example 16 Preparation of Multilayer Coatings

A multilayer coating was prepared from the CED coating composition of example 12, the primer-surfacer coating composition of example 13b, the basecoat compositions of example 14 (paints L1 to L6), and the clearcoat coating composition of example 15 according to the following procedure:
Preparation of the Test Panels:
12 Zinc-phosphated steel panels (®Gardobond 26S 6800 OC from Chemetall) were coated with the CED paint according to example 12 under following conditions: temperature of CED-bath: 30° C.
  deposition time: 2 min
  voltage: 300 V All coated panels were allowed to flash off at ambient temperature for thirty minutes and were then stoved for twenty minutes at 180° C. Dry film thickness of the CED layer was 22 µm for all panels. In the next step, the primer surfacer coating composition of example 13b was applied to all 12 panels (dry film thickness 30 µm), and after a flash off step (ten minutes at 23° C.) stoved for twenty minutes at 165° C. In a third step, the 12 panels were overcoated with the basecoat compositions of example 14 (paints L1 through L6, with 2 panels each for all paints L1 through L6). The basecoat layers (10 µm dry film thickness) were allowed to flash off for ten minutes at 23° C. and were then stoved for ten minutes at 80° C. Finally all panels were overcoated with the clearcoat composition of example 15 (50 µm dry film thickness) and stoved for twenty minutes at 140° C.

TABLE 3 detailed overview of the panel preparation

| Panel | CED | Stoving | Primer Surfacer | Stoving | Basecoat | Stoving | Clearcoat | Stoving |
|---|---|---|---|---|---|---|---|---|
| P1 | Ex. 12 | 20 min; 180° C. | Ex. 13b | 20 min; 165° C. | L1 | 10 min; 80° C. | Ex. 15b | 20 min; 140° C. |
| P1a | Ex. 12 | 20 min; 180° C. | Ex. 13b | 20 min; 165° C. | L1 | 10 min; 80° C. | Ex. 15b | 20 min; 140° C. |
| P2 | Ex. 12 | 20 min; 180° C. | Ex. 13b | 20 min; 165° C. | L2 | 10 min; 80° C. | Ex. 15b | 20 min; 140° C. |
| P2a | Ex. 12 | 20 min; 180° C. | Ex. 13b | 20 min; 165° C. | L2 | 10 min; 80° C. | Ex. 15b | 20 min; 140° C. |
| P3 | Ex. 12 | 20 min; 180° C. | Ex. 13b | 20 min; 165° C. | L3 | 10 min; 80° C. | Ex. 15b | 20 min; 140° C. |
| P3a | Ex. 12 | 20 min; 180° C. | Ex. 13b | 20 min; 165° C. | L3 | 10 min; 80° C. | Ex. 15b | 20 min; 140° C. |
| P4 | Ex. 12 | 20 min; 180° C. | Ex. 13b | 20 min; 165° C. | L4 | 10 min; 80° C. | Ex. 15b | 20 min; 140° C. |
| P4a | Ex. 12 | 20 min; 180° C. | Ex. 13b | 20 min; 165° C. | L4 | 10 min; 80° C. | Ex. 15b | 20 min; 140° C. |
| P5 | Ex. 12 | 20 min; 180° C. | Ex. 13b | 20 min; 165° C. | L5 | 10 min; 80° C. | Ex. 15b | 20 min; 140° C. |
| P5a | Ex. 12 | 20 min; 180° C. | Ex. 13b | 20 min; 165° C. | L5 | 10 min; 80° C. | Ex. 15b | 20 min; 140° C. |
| P6 | Ex. 12 | 20 min; 180° C. | Ex. 13b | 20 min; 165° C. | L6 | 10 min; 80° C. | Ex. 15b | 20 min; 140° C. |
| P6a | Ex. 12 | 20 min; 180° C. | Ex. 13b | 20 min; 165° C. | L6 | 10 min; 80° C. | Ex. 15b | 20 min; 140° C. |

Panels 1 to 6 (P1, P2, . . . P6) were exposed to a stone chip test according to DIN EN ISO 20567-1 (2×500 g of chips, transported with an air pressure of 0.2 MPa=2 bar), and panels 1a to 6a (P1a, P2a, . . . P6a) were used to run a humidity resistance testing according to DIN EN ISO 6270-2 (condensation atmosphere with constant humidity, test duration 240 hours). After the test time, the panels were allowed to regenerate for one hour at 23° C. and a relative humidity of 65% before the panels were evaluated according to DIN EN ISO 4628-2 (Designation of quantity and size of defects, and of intensity of uniform changes in appearance—Part 2: Assessment of degree of blistering). The results obtained are shown in table 4.

TABLE 4

| Panel | Test Results | |
|---|---|---|
| | Stone chip test rating | Degree of blistering |
| P1 | 2-3 | |
| P1a | | 3 (S3) |
| P2 | 3-4 | |
| P2a | | 4 (S3) |
| P3 | 1 | |

TABLE 4-continued

| Panel | Test Results | |
|---|---|---|
| | Stone chip test rating | Degree of blistering |
| P3a | | No blisters |
| P4 | 1-2 | |
| P4a | | No blisters |
| P5 | 2 | |
| P5a | | 2 (S2) |
| P6 | 1-2 | |
| P6a | | 2 (S2) |

This comparison shows that both stone chip test (indicating interlayer adhesion) and humidity resistance are markedly improved by use of a hydrophobically modified polyester as a basis for the polyurethane-vinyl polymer hybrid dispersion used in preparation of the base coat layer. This could not have been expected by a person skilled in the art.

The invention claimed is:

1. A process for the preparation of an aqueous polyurethane-vinyl polymer hybrid dispersion, comprising in step a), producing a polyester A' having residual hydroxyl and acid groups by a polyesterification process wherein a mixture of aliphatic diols A1 and aliphatic and/or aromatic diacids A2, optionally in the presence of hydroxyacids A3, and further optionally, in the presence of one or more of hydroxy compounds A11 having more than two hydroxyl groups, acid compounds A21 having more than two acid groups, or hydroxyacids A31 having more than one hydroxyl group or more than one acid group, or at least two hydroxyl groups and at least two acid groups, is esterified at an elevated temperature of up to 250° C., under removal of a water formed in the polycondensation reaction, in step b), producing hydrophobically modified polyesters A by reacting the acid groups of the polyester A' with a mono-functional compound A4 having an epoxide or aziridine functionality, and a linear or branched alkyl residue of at least four carbon atoms, in which reaction at least 90% of the remaining acid groups are converted to ester or amide groups, in step c), mixing the hydrophobically modified polyesters A with acids B that have further groups which react with isocyanates under formation of urethanes, ureas, or thiourethanes, optionally, hydroxy-functional oligomeric or polymeric compounds C selected from the group consisting of polyesters, polycarbonates, polyethers, polyamides, polydienes and polyenes, and which have at least two hydroxyl groups per molecule, and optionally, monomeric hydroxy compounds D having at least two hydroxyl groups per molecule, wherein none, either, or both of C and D are added to the mixture, and heating the resulting mixture under stirring to at least 60° C. to form a homogeneous solution, in step d), adding a substoichiometric quantity of a multifunctional isocyanate I to the homogeneous solution and keeping the reaction temperature in a range of from 60° C. to 150° C., to form a prepolymer, and wherein the amount of substance of isocyanate groups in the quantity of multifunctional isocyanate I added is less than the sum of the amounts of substance of isocyanate-reactive hydroxyl groups, of the compounds A, B, C, and D present in this reaction, so that no more unreacted isocyanate groups are present in the reaction mixture, in step e), adding to this the prepolymer, a solution which comprises at least one olefinically unsaturated monomer H1 having no further functional group other than one or more vinyl or polymerisable olefinically unsaturated groups, and at least one olefinically unsaturated monomer H2 having at least one hydroxyl group and a vinyl or polymerisable olefinically unsaturated group, optionally, an antioxydant or radical scavenger, and optionally, a solvent S which is inert in the reaction, and homogenising the solution and the prepolymer to form a homogenous mixture, in step f), adding to the homogeneous mixture, a further multifunctional isocyanate I in stoichiometric excess so that the ratio of the amount of substance of isocyanate groups n(NCO) to the sum n(OH, Σ) of the amounts of substance of isocyanate-reactive groups hydroxyl groups present in the reaction mixture satisfies the following formula:

$n(NCO)/n(OH,\Sigma) \geq 1.02$ mol/mol, in step g), adding thereto a mixture which comprises compounds G, water, optionally, compounds E, optionally, compounds F, and homogenising well the resulting mixture, in step h), adding an aqueous solution of a radical initiator to the mixture of resulting from step g), and in step i), polymerising the reaction mixture to obtain a dispersion which is finally cooled to room temperature and filtered.

2. The process of claim 1 wherein in step a), a mixture of aliphatic diols A1 and aliphatic and/or aromatic diacids A2, is esterified at the elevated temperature of up to 250° C., under removal of the water formed in the polycondensation reaction, and in step b), the polyester A' formed in the step a) is treated at a temperature of from 150° C. to 220° C. with a compound A4 selected from the group consisting of a monoepoxide compound and a monoaziridine compound, whereby the acid groups of the polyester A' are consumed under addition and formation of an ester or an amide group, and of a hydroxyl or amino group by ring opening of the oxirane or aziridine ring.

3. The process of claim 1 wherein the hydroxy-functional monomers H2 have two hydroxyl groups and are partial esters of polyhydric alcohols having at least two hydroxyl groups, and olefinically unsaturated carboxylic acids selected from the group consisting of acrylic acid, methacrylic acid, and their homologues.

4. The process of claim 1 wherein compounds E and/or compounds F are used.

5. The process of claim 4 wherein compounds E are used, and are selected from the group consisting of the monohydroxymonoamines 2-aminoethanol, 2-methylaminoethanol, and 3-aminopropanol, the dihydroxymonoamines 2-amino-1,3-propanediol, diethanolamine, and 1,1'-iminodi-2-propanol.

6. The process of claim 1 wherein compounds C and/or compounds D are used.

7. The process of claim 1 wherein a hydroperoxide is used as the radical initiator, and is combined with a reducing agent.

* * * * *